Sept. 27, 1960 D. ROSENSTOCK 2,954,523
HIGH IMPEDANCE MEASURING APPARATUS
Filed Nov. 28, 1956 2 Sheets-Sheet 1

INVENTOR.
DAVID ROSENSTOCK
BY
Allan Rottenberg
ATTORNEY

INVENTOR.
DAVID ROSENSTOCK
BY
ATTORNEY

United States Patent Office 2,954,523
Patented Sept. 27, 1960

2,954,523

HIGH IMPEDANCE MEASURING APPARATUS

David Rosenstock, Fullerton, Calif., assignor to North American Aviation, Inc.

Filed Nov. 28, 1956, Ser. No. 624,812

9 Claims. (Cl. 324—83)

This invention relates to high impedance measuring apparatus and more particularly to circuitry for presenting a high input impedance to a voltage to be measured, which voltage is produced by a source having a high internal impedance.

The precision measurement of the phase and magnitude of an A.-C. voltage produced by a source of high internal impedance is complicated by the loading effect of the measuring apparatus upon the source. Measuring instruments are commonly provided with a high input impedance in order to minimize the load effect errors of the measuring instrument. However, as the internal impedance of a source whose signal is to be measured increases, the load effect error which exists with any given measuring instruments will correspondingly increase.

The present invention is concerned with a device which will effectively eliminate load effect errors over a wide range of source impedances and frequencies. It may be used in conjunction with magnitude and/or phase measuring instruments such as oscilloscopes, volt meters, phase meters, and ratiometers to permit precision measurements to be made. By eliminating load effect errors the precision with which measurements can be made is limited only by the accuracy of the measuring instrument used.

In accordance with the present invention, there is applied an equal and opposite or bucking voltage to the unknown source whose voltage is to be measured. The magnitude and phase of the bucking voltage is indicated on suitable measuring instrument. In one embodiment of the invention the bucking voltage source is manually varied until equality of the bucking voltage and the voltage to be measured is indicated by a null indicator. When the two opposing voltages are equal no current is drawn from the source, no voltage drop occurs across the source impedance, and the measuring instrument measures the true source voltage. In a second embodiment there is provided means for sensing the voltage of the unknown source while the bucking voltage is provided automatically by an amplifier having the input thereof derived from the sensed voltage and the output thereof coupled to oppose the sensed voltage.

It is an object of this invention to improve the measurement of alternating current signals produced by a source having a high internal impedance.

Still another object is the elimination of load effect errors in the measurement of A.-C. signals.

A further object is the provision of measuring apparatus having a high input impedance.

Other objects of the invention will become apparent from the following description taken in connection with the accompaying drawings, in which Fig. 1 comprises a diagrammatic illustration of one form of the invention;

Figure 2:
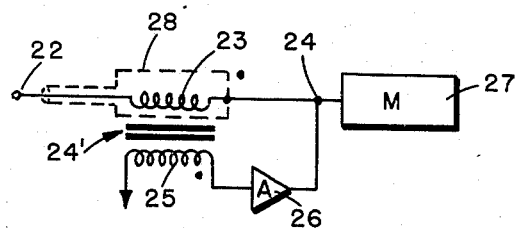
Fig. 2 is a diagrammatic illustration of another form of the invention.
Figure 4:
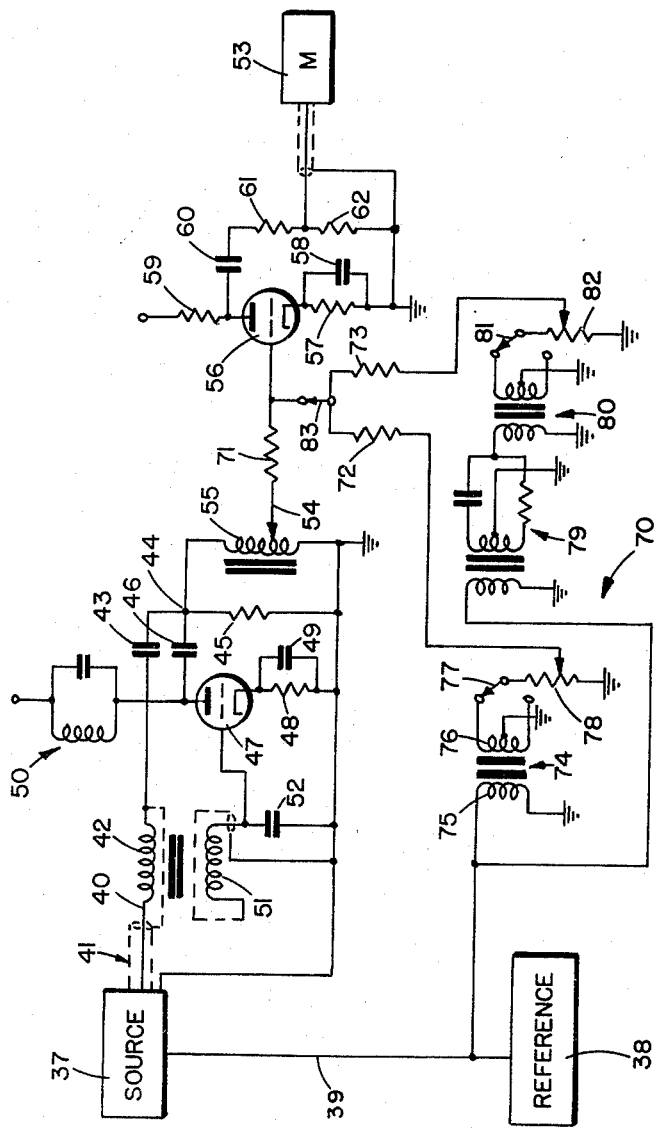

And Fig. 4 is a circuit diagram of measuring apparatus which embodies the principles illustrated in Fig. 2.

Figure 1:
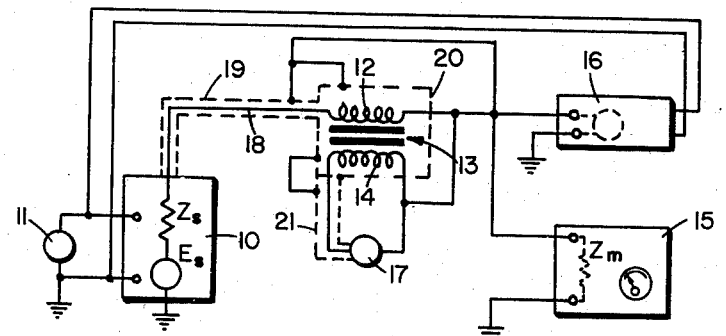

Illustrated in Fig. 1 is a source 10 of an A.-C. signal which is referenced or controlled by a reference source 11 of known or reference phase and magnitude. The signal from the source 10 is sensed by an impedance such as inductor 12 which comprises the primary winding of transformer 13 having a secondary winding 14. Coupled in parallel between a common terminal such as ground and one end of inductor 12 are an indicating instrument such as the meter 15 and a source 16 of a voltage of manually variable phase and magnitude. The source 16 is likewise referenced or controlled by the reference source 11. Coupled across the inductor 14, the transformer secondary, is a null indicator 17 which may be, for example, a vacuum tube voltmeter or an oscilloscope used in conjunction with a preamplifier or, at low frequencies, an ordinary telephone receiver. The source 16 may comprise a phase shifter (as indicated by reference numeral 70 and described hereinafter in connection with Fig. 4) provided with appropriate switching so that phasing over 360° and over the required frequency range can be obtained. Suitable controls may be provided so that the phase and magnitude of the voltage source 16 may be varied. At low frequencies transformer 13 may contain an iron core while at high frequencies the losses in the core become excessive and an air core is preferred.

If the input impedance of the measuring instrument 15 be $Z_m$ and the internal impedance of the source 10 which produces a voltage $E_s$ is $Z_s$, then the measuring instrument 15 could provide accurate measurements when connected directly across the source 10 only if the impedance $Z_s$ of the source 10 is considerably less than the impedance $Z_m$ of the instrument 15. The actual voltage $E_m$ indicated by the instrument 15 (when connected directly across the source 10) is given by $$E_m = \frac{E_s}{1 + \frac{Z_s}{Z_m}} \quad (1)$$

It will be seen that the error in the reading $E_m$ increases as the source impedance $Z_s$ increases. The circuit of Fig. 1, by substantially preventing the flow of current through the sensing inductor 12 and therefore from the source, presents an exceedingly high impedance to the unknown voltage source.

In operation the phase and magnitude of the voltage from source 16 are adjusted until a null voltage is observed on indicator 17. If the source voltage is distorted the secondary 14 of the transformer may be tuned (by circuitry not shown) to the fundamental frequency of the source 10 or a suitable filter (not shown) may be inserted in series with the indicator 17. When a null is observed the fundamental frequency voltage across the inductor 12 is zero and no fundamental frequency current flows through the transformer. Thus the bucking voltage from the bucking source 16 must be identical to the voltage across the source 10 except for the voltage drop caused by current flowing to ground through the stray capacitance associated with the lead 18 connecting source 10 and inductor 12. At low frequencies the effect of this stray capacitance is negligible.

At higher frequencies this source of error may be eliminated by providing the shielding 19 about lead 18, shielding 20 about the transformer, and shielding 21 on the lead connecting the indicator 17 to the secondary 14. Since both the unknown source 10 and the bucking source 16 are referenced from the same reference 11, the frequencies of the several sources are the same and, further, any effect of the bucking source 16 upon the reference source is reflected in the voltage of the unknown source 10. Therefore, the relationship of interest, the relation of the voltage of source 10 to the reference voltage, remains constant. When equality of the voltages from the source 10 and the source 16 has been achieved, as indicated by the null indicator 17, no current is flowing from the source 10 to the measuring apparatus which is therefore presenting an exceedingly high impedance to the source being measured. All load effect errors are thereby eliminated and true measurements are obtained.

Indicated in Fig. 2 is a modification of the apparatus of Fig. 1 which eliminates the need to obtain a null indication before making the desired measurement. In this arrangement the voltage from a source to be measured is applied at terminal 22 to one end of a sensing impedance such as an inductor 23 which comprises the primary winding of a transformer 24' having a secondary winding 25. The bucking voltage is applied to the other end of inductor 23 at point 24 and in this case is automatically maintained substantially equal to the voltage at terminal 22. The bucking voltage is derived from the output of an amplifier 26 which has as the input thereof the voltage across the secondary winding 25. The phasing of the transformer 24' and amplifier 26 are selected to cause the voltage at point 24 to oppose the voltage at point 22. As in the apparatus of Fig. 1, the indicating instrument 27 is connected in parallel with the source of bucking voltage to the end 24 of the inductor 23. Suitable high frequency shielding 28 may be provided as explained above.

Two characteristics of the circuit of Fig. 2 are of primary consideration. These are the difference between the voltage $e_o$ at point 24 and the voltage $e_i$ at point 22 and the effective input impedance of the system. The voltage at point 24 is $$e_o = -Kn(e_o - e_i) \qquad (2)$$

where negative K is the gain of the amplifier and $n$ is the turns ratio of the transformer 24'. The transfer function of the system is $$\frac{e_o}{e_i} = \frac{1}{1 + \frac{1}{Kn}} \qquad (3)$$

and if $Kn$ is much much greater than one, the error in the voltage $e_o$ read by the instrument 27 will be $$\frac{e_o - e_i}{e_i} \approx \frac{-1}{Kn} \qquad (4)$$

Figure 3:
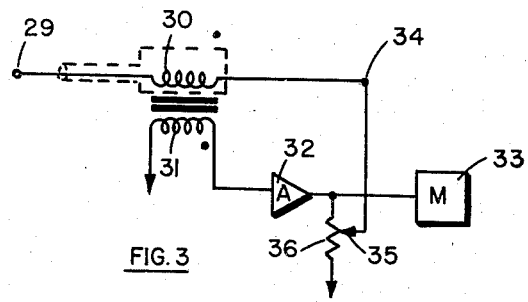
Fig. 3 illustrates a modification of the apparatus of Fig. 2.

It will be readily seen that the error is inversely proportional to the gain of the amplifier. It should be noted, however, that the error is a constant percentage and can readily be compensated for if desired by a simple re-calibration of the measuring instrument 27. Alternatively, the circuit of Fig. 2 may be modified as shown in Fig. 3 to provide an adjustment which may be so manipulated as to make $e_o$ precisely equal to $e_i$. The circuit of Fig. 3 comprises an input terminal 29, a transformer primary 30, a transformer secondary 31, an amplifier 32 and an indicating instrument 33 which may be structurally and functionally similar to the corresponding elements 22, 23, 25, 26 and 27 of Fig. 2. In this circuit, however, only a fraction of the bucking voltage output of the amplifier 32 is applied to the end 34 of inductor 30. The magnitude of the bucking voltage applied to point 34 is selected by the tap 35 of the output resistor 36 of the amplifier.

Considering now the input impedance of the system of Fig. 2, the current $i$ flowing through the inductor 23 is $$i = \frac{e_i - e_o}{Z_T} \qquad (5)$$

where $Z_T$ is the impedance between points 22 and 24. The effective input impedance $Z_{in}$ is $$Z_{in} = \frac{e_i}{i} = \frac{e_i Z_T}{e_i - e_o} \qquad (6)$$

and therefore $$Z_{in} = Z_T(Kn + 1) \qquad (7)$$

If $Kn$ is much much larger than one, then $$Z_{in} = Z_T Kn \qquad (8)$$

from which it may be seen that the effective input impedance of the circuit of Fig. 2 is effectively increased by a factor equal to the product of the amplifier gain and the transformer turns ratio.

Fig. 4 illustrates the circuitry of an exemplary embodiment of the apparatus of Fig. 2 as adapted for the comparison of the voltage and phase of an A.-C. signal. A source 37 of signal to be measured is referenced from a reference source 38 through a lead 39. A shielded lead 40 of input conductor 41 is coupled with one end of a sensing inductor 42 having the other end thereof coupled through capacitor 43 to one end 44 of a load resistor 45. Resistor 45 is coupled through capacitor 46 to the plate of an amplifier including vacuum tube 47 and bias resistor 48 shunted by bypass capacitor 49. The plate of the tube 47 is coupled to a positive source of potential through a tuned circuit 50 tuned to the fundamental frequency of the source 37 and reference source 38. The tuned circuit 50 provides for stabilization of the feedback amplifier circuitry. The input to the control grid of tube 47 is derived from the inductor 51 connected between the control grid and ground and shunted by capacitor 52. Inductor 51 and capacitor 52 are tuned for parallel resonance at the fundamental source frequency in order to provide maximum input to the amplifier. The inductor 51, inductively coupled to coil 42, is phased to provide a bucking voltage at point 44 of the amplifier output which opposes the voltage sensed by the coil 42. The bucking voltage or a selected fraction thereof is fed to the indicating instrument 53 from the variable tap 54 on scale selector coil 55 coupled between point 44 and ground. The tap 54 is coupled to the grid of an output amplifier comprising vacuum tube 56, bias resistor 57, bypass capacitor 58 and a plate resistor 59 connected to source of positive potential. The plate of tube 56 is coupled to ground through capacitor 60 and resistors 61, 62, the voltage fed to the instrument 53 being obtained directly across resistor 62.

For use as a phase comparator there is provided a source 70 of voltage of selectively variable phase and magnitude which is compared with the voltage from tap 54 in a summing network comprising resistors 71, 72 and 73. The source 70 includes a first phase shifter which feeds to resistor 72 a voltage of selectively variable magnitude having one of two mutually opposite phases such as 0° or 180° with respect to the reference phase. This first phase shifter may comprise a transformer 74 having a primary 75 energized from reference source 38 and a grounded center tap secondary 76 having the ends thereof selectively coupled through switch 77 to potentiometer 78 which has the movable arm thereof connected to resistor 72 of the summing network. The magnitude of the voltage obtained from potentiometer 78 is indicated by a suitable calibrated dial (not shown) thereon while the phase is indicated by the setting of the switch 77.

Included in the source 70 is a second phase shifter which feeds to resistor 73 of the summing network a second voltage of selectively variable magnitude having one of two mutually opposite phases such as 90° or 270° which are in phase quadrature with the phases of the voltage from potentiometer 78. The second phase shifter comprises a 90° phase shifter 79, energized from reference 38, which feeds a transformer 80, switch 81 and potentiometer 82 which are similar in function and arrangement to elements 74, 77 and 78 respectively. However, due to the 90° phase shift of circuit 79, switch 81 feeds to potentiometer 82 a voltage related to the reference phase by either 90° or 270°. Thus a pair of reference quadrature components, each of selectively variable magnitude are summed by resistors 72 and 73 to provide a voltage of variable magnitude having any desired phase relative to the reference phase. The phase of the voltage provided by resistors 72 and 73 may be determined from the vector sum of the known quadrature components thereof.

In operation, the switches 77 and 81 are set to produce quadrature components which are of opposite phase relative to the respective quadrature components of the voltage from tap 54 and the potentiometers 78 and 82 are simultaneously varied until the indicator 53 reads zero. The zero reading of the indicator occurs when the quadrature components from source 70 are respectively equal to the quadrature components of the unknown voltage whereby the calibrated dials of potentiometers 78 and 82 indicate the respective magnitudes of the unknown quadrature components thereof, the magnitude and phase of the unknown voltage.

The absolute magnitude of the voltage from source 37 may be directly indicated on meter 53 when the source 70 is disabled as by opening switch 83 which connects the junction of resistors 72, 73 to the input of tube 56.

For use with the embodiment of Fig. 1 the variable source 70 will have the junction of resistors 72, 73 connected to the junction of inductor 12 and meter 15 whereby the unknown phase may be determined from the relative magnitudes of the quadrature components produced by source 70 and the unknown magnitude will be indicated on the meter.

Although the invention has been described and illustrated in detail, it is to be clearly understood that the same is by way of illustration and example only and is not to be taken by way of limitation, the spirit and scope of this invention being limited only by the terms of the appended claims.

I claim:

1. High impedance measuring apparatus for measuring the phase and magnitude of the voltage produced by an unknown source which is controlled by a reference source comprising an input inductor, a source of bucking voltage controlled by said reference source, means for varying the phase and magnitude of said bucking voltage, an indicating instrument, said instrument and bucking source being connected in parallel between one end of said input inductor and a common terminal, and null indicator means for indicating the voltage across said input inductor, said common terminal and the other end of said input inductor comprising the input terminals of said apparatus and adapted to connect said apparatus across the unknown source.

2. Apparatus for indicating the phase and magnitude of an unknown voltage source comprising an input inductor having one end adapted to be connected to said source, an amplifier, means for feeding the voltage across said inductor to the input of said amplifier, means for coupling the output of said amplifier to the other end of said inductor, a source of reference phase, first phase shift means responsive to said reference source for generating a voltage of selectively variable magnitude having one of two mutually opposite phases, second phase shift means responsive to said reference source for generating a voltage of selectively variable magnitude having one of two mutually opposite phases, the phases of said first phase shift means being in phase quadrature with the phases of said second phase shift means, means for indicating the sum of the output of said amplifier and said phase shift means, and means for indicating the magnitude of each of said selectively variable voltages.

3. Apparatus for indicating the phase and magnitude of an unknown voltage source comprising an input inductor having one end adapted to be connected to said source, an amplifier, means for feeding the voltage across said inductor to the input of said amplifier, means for coupling the output of said amplifier to the other end of said inductor, a source of reference phase, phase shift means responsive to said reference source for generating a voltage of selectively variable phase and magnitude, and means for indicating the difference between said last-mentioned voltage and the output of said amplifier.

4. A voltage and phase comparator comprising a transformer having primary and secondary windings, a pair of input terminals respectively connected to one end of said primary winding and one end of said secondary winding, an amplifier having the input thereof coupled to the other end of said secondary winding and the output thereof coupled to the other end of said primary winding, a reference source, means responsive to said reference source for producing a voltage of selectively variable phase and magnitude, a summing network, means for feeding said selectively variable voltage and the output of said amplifier to said summing network, and means for indicating the output of said network.

5. In combination input means having a high input impedance and adapted to be connected across a source to be measured, said input means comprising an inductor having one end thereof adapted to be coupled to said source, an amplifier having the output thereof coupled to the other end of said conductor, and means for coupling the voltage across said inductor to the input of said amplifier.

6. In combination, input means having a high input impedance and adapted to be connected across a source to be measured, said input means comprising an inductor having one end thereof adapted to be coupled to said source, an amplifier having the output thereof coupled to the other end of said inductor, means for coupling the voltage across said inductor to the input of said amplifier, a voltage source of known and variable phase and magnitude, and means for coupling said last-mentioned source to the output of said amplifier.

7. Apparatus for measuring the voltage produced by a source comprising input means having a high input impedance and adapted to be connected across the source to be measured, said input means comprising an inductor having one end thereof adapted to be coupled to said source, an amplifier having an output impedance, a tap on said impedance for selecting a predetermined fraction of the output of said amplifier, means coupling said tap with the other end of said inductor, and a second inductor comprising the input to said amplifier and inductively coupled to said first inductor.

8. Apparatus for measuring a voltage of predetermined fundamental frequency comprising an amplifier, an input circuit parallel resonant at said fundamental frequency, said circuit comprising a transformer having primary and secondary windings, said secondary winding being coupled to the input of said amplifier, said primary winding having one end thereof adapted to be connected to the source of voltage to be measured, and means for coupling the output of said amplifier to the other end of said primary winding.

9. Apparatus for measuring the voltage of a source of predetermined fundamental frequency comprising a transformer having primary and secondary windings, shielding on said transformer connected to a common terminal of said apparatus, said transformer including a primary winding adapted to be connected at one end thereof to one terminal of said source and a secondary winding, an amplifier having a control element and an output circuit, a circuit parallel resonant at said frequency connected between control element and said common terminal, said parallel resonant circuit comprising said secondary winding and a capacitor connected thereacross, and means for coupling said amplifier output circuit to the other end of said primary winding.

References Cited in the file of this patent

UNITED STATES PATENTS

| | | |
|---|---|---|
| 1,495,466 | Wente | May 27, 1924 |
| 2,354,483 | Schock | July 25, 1944 |
| 2,471,105 | Gustafsson | May 24, 1949 |
| 2,489,272 | Daniels | Nov. 29, 1949 |
| 2,593,175 | Packard | Apr. 15, 1952 |
| 2,601,485 | Yetter | June 24, 1952 |
| 2,719,262 | Bousman | Sept. 27, 1955 |
| 2,842,740 | Sparks | July 8, 1958 |

FOREIGN PATENTS

| | | |
|---|---|---|
| 892,313 | Germany | Oct. 5, 1953 |

UNITED STATES PATENT OFFICE
CERTIFICATION OF CORRECTION

Patent No. 2,954,523 September 27, 1960

David Rosenstock

It is hereby certified that error appears in the above numbered patent requiring correction and that the said Letters Patent should read as corrected below.

Column 6, line 33, for "conductor" read -- inductor --.

Signed and sealed this 27th day of June 1961.

(SEAL)
Attest:

ERNEST W. SWIDER
Attesting Officer

DAVID L. LADD
Commissioner of Patents